US010662123B2

(12) United States Patent
Wang

(10) Patent No.: US 10,662,123 B2
(45) Date of Patent: May 26, 2020

(54) RURAL BULK ORGANIC WASTE POLLUTANT SOURCE COMPREHENSIVE TREATMENT SYSTEM AND METHOD

(71) Applicants: HUNAN BEETLE ENVIRONMENTAL SCIENCE AND TECHNOLOGY CO, LTD., Hunan (CN); Shen Wang, Hunan (CN)

(72) Inventor: Shen Wang, Hunan (CN)

(*) Notice: Subject to any disclaimer, the term of this patent is extended or adjusted under 35 U.S.C. 154(b) by 289 days.

(21) Appl. No.: 15/570,383

(22) PCT Filed: May 12, 2015

(86) PCT No.: PCT/CN2015/078735
§ 371 (c)(1),
(2) Date: Oct. 30, 2017

(87) PCT Pub. No.: WO2016/173000
PCT Pub. Date: Nov. 3, 2016

(65) Prior Publication Data
US 2018/0148389 A1 May 31, 2018

(30) Foreign Application Priority Data

Apr. 30, 2015 (CN) .......................... 2015 1 02153951

(51) Int. Cl.
*C05F 3/06* (2006.01)
*C05F 3/00* (2006.01)
(Continued)

(52) U.S. Cl.
CPC .............. *C05F 3/06* (2013.01); *B01D 53/346* (2013.01); *B01D 53/84* (2013.01); *B09B 3/00* (2013.01);
(Continued)

(58) Field of Classification Search
None
See application file for complete search history.

(56) References Cited

U.S. PATENT DOCUMENTS 5,354,349 A * 10/1994 Inoue .................. C05F 3/00
71/9
5,401,291 A * 3/1995 Inoue .................. B01F 7/041
71/9

(Continued)

FOREIGN PATENT DOCUMENTS

CN 1613830 5/2005
CN 1857802 11/2006

(Continued)

OTHER PUBLICATIONS

"International Search Report (Form PCT/ISA/210)", dated Feb. 4, 2016, with English translation thereof, pp. 1-4.

*Primary Examiner* — Wayne A Langel
(74) *Attorney, Agent, or Firm* — Erson IP (Nelson IP)

(57) ABSTRACT

A rural bulk organic waste pollutant source comprehensive treatment system including a solid high-temperature aerobic fermentation reactor, a liquid high-temperature aerobic fermentation reactor and a multifunctional boiler is provided. A rural bulk organic waste pollutant source comprehensive treatment method. For excretion waste of a livestock farm adopting the technology of manure cleaning by urine submerging, a solid-liquid separation is firstly performed thereto, wherein solid is conveyed to the solid high-temperature aerobic fermentation reactor and fermented to produce solid organic fertilizers, and liquid is conveyed to the liquid high-temperature aerobic fermentation reactor and fermented to produce liquid organic fertilizers. For dry collection manure of a livestock and poultry farm, carbon-containing auxiliary materials, residues left after dead animals and household waste being incinerated by the multi- (Continued)

functional boiler, and ash generated by straw burning are added thereto, and then the mixture is conveyed to the solid high-temperature aerobic fermentation reactor and fermented to produce solid organic fertilizers. Exhaust fume and hot water produced by the multifunctional boiler pass through the solid high-temperature aerobic fermentation reactor and the liquid high-temperature aerobic fermentation reactor to heat the reactors and keep the reactors warm.

10 Claims, 2 Drawing Sheets

(51) Int. Cl.
| | |
|---|---|
| C05F 1/00 | (2006.01) |
| C05F 1/02 | (2006.01) |
| C05F 9/00 | (2006.01) |
| C05F 9/02 | (2006.01) |
| C05F 17/60 | (2020.01) |
| C05F 17/90 | (2020.01) |
| F23G 1/00 | (2006.01) |
| F22B 1/18 | (2006.01) |
| F23G 7/10 | (2006.01) |
| F23G 5/00 | (2006.01) |
| B09B 3/00 | (2006.01) |
| B09B 5/00 | (2006.01) |
| C05F 17/971 | (2020.01) |
| F23G 5/46 | (2006.01) |
| B01D 53/34 | (2006.01) |
| B01D 53/84 | (2006.01) |
| F22B 35/00 | (2006.01) |
| F23G 5/04 | (2006.01) |

(52) U.S. Cl.
CPC .............. *B09B 3/0083* (2013.01); *B09B 5/00* (2013.01); *C05F 1/00* (2013.01); *C05F 1/02* (2013.01); *C05F 3/00* (2013.01); *C05F 9/00* (2013.01); *C05F 9/02* (2013.01); *C05F 17/60* (2020.01); *C05F 17/90* (2020.01); *C05F 17/971* (2020.01); *F22B 1/1861* (2013.01); *F22B 1/1892* (2013.01); *F22B 35/007* (2013.01); *F23G 1/00* (2013.01); *F23G 5/00* (2013.01); *F23G 5/008* (2013.01); *F23G 5/04* (2013.01); *F23G 5/46* (2013.01); *F23G 7/10* (2013.01); *F23G 2203/101* (2013.01); *F23G 2206/20* (2013.01); *F23G 2209/262* (2013.01); *Y02A 40/208* (2018.01); *Y02E 50/343* (2013.01); *Y02P 20/145* (2015.11); *Y02W 30/47* (2015.05)

(56) References Cited

U.S. PATENT DOCUMENTS

| | | | |
|---|---|---|---|
| 9,688,584 B2 * | 6/2017 | Bhalla | C05F 3/00 |
| 2004/0025715 A1 * | 2/2004 | Bonde | A01C 3/00 |
| | | | 99/485 |
| 2005/0044911 A1 * | 3/2005 | Shimose | C05F 9/00 |
| | | | 71/8 |
| 2008/0251438 A1 * | 10/2008 | Yu | C05F 3/00 |
| | | | 210/178 |
| 2013/0026760 A1 | 1/2013 | Lee et al. | |

FOREIGN PATENT DOCUMENTS

| | | |
|---|---|---|
| CN | 102874996 | 1/2013 |
| CN | 103406331 | 11/2013 |

\* cited by examiner

RURAL BULK ORGANIC WASTE POLLUTANT SOURCE COMPREHENSIVE TREATMENT SYSTEM AND METHOD

CROSS-REFERENCE TO RELATED APPLICATION

This application is a 371 application of the International PCT application serial no. PCT/CN2015/078735, filed on May 12, 2015, which claims the priority benefit of China application no. 201510215395.1, filed on Apr. 30, 2015. The entirety of each of the abovementioned patent applications is hereby incorporated by reference herein and made a part of this specification.

BACKGROUND

Technical Field

The present invention belongs to the technical field of environment protection, and particularly relates to a source comprehensive treatment technology of rural bulk organic waste pollutants including manure and dead livestock and poultry bodies in livestock and poultry farms, straw and household waste.

Related Art

Rural bulk organic waste pollutants refer to manure and livestock and poultry animal bodies generated by large-scale livestock and poultry breeding, straw and household waste.

3.264 billion tons (raw weight) of livestock and poultry manure was discharged in China in 2009, 1.6 times of the total discharge amount of industrial solid waste in the same period (the National Bureau of Statistics of the People's Republic of China, 2010). Livestock and poultry manure can generate serious odor to pollute the air. Under a condition of poor ventilation, livestock and poultry manure can be decomposed into ammonia, sulfuric acid, vinyl alcohol, dimethyl sulfide, hydrogen sulfide, methylamine, trimethylamine and other foul gases, which smell like rotten onions, rotten eggs or fish and endanger the health of people and make air pollution worse. Besides, livestock manure can cause organic pollution of water. Free discharging of livestock manure likely causes eutrophication of water, resulting in deterioration of water quality. Over-high content of nitrate in underground water can also be caused after manure and sewage seep underground. In addition, livestock manure can spread zoonoses. There are over 90 zoonoses which can be transmitted to human from animals mainly through carriers of livestock manure and excrement. Therefore, livestock manure is one of the rural bulk waste pollutants.

Normally, bred livestock and poultry animals have a certain case fatality rate, for example, the case fatality rate of pigs in a pig farm is usually 3-5%. The bodies of these dead livestock and poultry animals carry harmful bacteria. What is worse, some unscrupulous vendors resell the dead bodies to make an exorbitant profit, which directly endangers food safety. Therefore, dead livestock is also one of main rural bulk waste pollutants.

A huge amount of biomass is generated by photosynthesis in wide rural areas each year from. The annual yield of biomass straw in China is over 600 million tons. Straw is usually treated through in situ burning. Toxic gases can be generated from burning to seriously affect the quality of the atmospheric environment, and cause significant increase in the number of total suspended particulates in the air, which is one of the main reasons for atmospheric haze. Smoke generated by burning contains massive toxic and harmful gases like CO and SO2, which are harmful for human health. Dense smoke generated by straw burning also threatens traffic safety, and directly affects the normal operation of civil aviation, railways and expressways. Besides, straw burning has also caused lots of fire disasters. It is reported that 1 billion yuan of direct economic loss is caused by straw burning in He'nan Province each year. Therefore, straw is also one of the main rural bulk waste pollutants.

Due to regional decentralization, the treatment cost of rural household waste is very high. Rural residents ordinarily dump waste wherever they want. Over time, water pollution and air pollution are inevitable. Besides, some waste carrying pathogens can spread diseases. Therefore, household waste is also one of the main rural bulk waste pollutants.

Bred livestock and poultry manure, especially manure from pig farms, is characterized in huge yield and high moisture content, and cannot be transformed into fertilizers easily. At present, the common treatment method is to conduct solid-liquid separation after anaerobic fermentation, conduct aerobic fermentation on biogas residues to produce solid organic fertilizers, and treat biogas slurry into sludge and water which can be discharged at a standard level by means of a sewage treatment plant. The process is high in investment and great in energy consumption. Sewage can hardly be discharged at a standard level. The high content of nitrogen, phosphorus and potassium in water is one of water eutrophication sources.

At present, harmless treatment methods for dead livestock and poultry animals and household waste are mainly high-temperature burning and sanitary landfill. The methods have the problems that treatment cost is too high, collection and transfer processes are complicated, and supervision measures are insufficient. High-temperature burning can generate smoke to pollute atmosphere, and sanitary landfill requires occupation and consumption of land resources. If not properly handled, underground water resources can be polluted, and fire blast risk can be caused.

Thus, it is necessary to treat sources of pollutants into resources based on the principle of proximity.

SUMMARY

The present invention aims to solve the technical problem and provide a rural bulk organic waste pollutant source comprehensive treatment system and method aiming at the problems in the background art, so as to realize zero discharge, zero pollution and recycling application of rural bulk organic waste, protect the environment and guarantee the health of people.

The invention adopts the technical scheme that:

a rural bulk organic waste pollutant source comprehensive treatment system includes a solid high-temperature aerobic fermentation reactor, a liquid high-temperature aerobic fermentation reactor and a multifunctional boiler; the multifunctional boiler is a boiler which can adopt various fuels to incinerate dead animals and household waste and produce hot water; a feeding system of the solid high-temperature aerobic fermentation reactor is a waste treatment system for a livestock farm adopting a technology of manure cleaning by urine submerging or a waste treatment system for a livestock farm adopting a technology of dry manure collection, the waste treatment system for the livestock farm adopting the technology of manure cleaning by urine submerging is provided with a solid-liquid separation unit, and the waste treatment system for the livestock farm adopting the technology of dry manure collection is a dry collection manure carbon-containing auxiliary material adding unit; liquid output of the solid-liquid separation unit in the waste treatment system for the livestock farm adopting the technology of manure cleaning by urine submerging is connected to the liquid high-temperature aerobic fermentation reactor, the liquid high-temperature aerobic fermentation reactor produces liquid organic fertilizers, solid output of the solid-liquid separation unit in the waste treatment system for the livestock farm adopting the technology of manure cleaning by urine submerging is connected to the solid high-temperature aerobic fermentation reactor, and the solid high-temperature aerobic fermentation reactor produces solid organic fertilizers; an incineration door is arranged on the rear portion of the multifunctional boiler, and a dead animal and household waste delivery unit is arranged beside the incineration door; a burner and an automatic straw fuel delivery unit are installed on the front portion of the multifunctional boiler, an air feeder is connected to the bottom of the multifunctional boiler, and a smoke exhaust pipe of the multifunctional boiler is connected with a draught fan; the draught fan is connected to an input port of a cold air and hot air mixer, another input port of the mixer is connected to the atmosphere, output ports of the cold air and hot air mixer are connected to an input port of an air blower, and an output port of the air blower is connected with an air inlet of the solid high-temperature aerobic fermentation reactor and an air inlet of the liquid high-temperature aerobic fermentation reactor; an exhaust duct of the solid high-temperature aerobic fermentation reactor and an exhaust duct of the liquid high-temperature aerobic fermentation reactor are connected to a biological deodorization filtration tower after passing through a cooling condenser, and a hot water output pipeline of the multifunctional boiler is connected to a water jacket of the solid high-temperature aerobic fermentation reactor and a water jacket of the liquid high-temperature aerobic fermentation reactor; and the comprehensive treatment system is also provided with an automatic control system.

In the above technical scheme, a raw manure pit for manure cleaning by urine submerging and a delivery unit are arranged in front of the solid-liquid separation unit, and a solid material bin, a solid material delivery unit, a liquid delivery pump and a liquid delivery pipeline are arranged behind the solid-liquid separation unit.

In the above technical scheme, the treatment system for the livestock farm adopting the technology of dry manure collection includes a dry collection manure bin and an auxiliary material bin, the auxiliary bin contains carbon-containing auxiliary materials, a discharge outlet of the dry collection manure bin and a discharge outlet of the auxiliary material bin are connected with a screw conveyer, and a discharge end of the screw conveyer is connected with the solid high-temperature aerobic fermentation reactor.

In the above technical scheme, the liquid output of the solid-liquid separation unit is connected to the liquid high-temperature aerobic fermentation reactor through the liquid delivery pump and connecting pipelines, and the solid output of the solid-liquid separation unit is connected to the solid high-temperature aerobic fermentation reactor through the screw conveyer or a belt conveyer.

In the above technical scheme, the smoke exhaust pipe of the multifunctional boiler is connected to the air inlet of the solid high-temperature aerobic fermentation reactor and the air inlet of the liquid high-temperature aerobic fermentation reactor through the draught fan, the cold air and hot air mixer, the air blower and connecting pipelines.

In the above technical scheme, an automatic control system is further arranged; the automatic control system includes a sensor, a controller and a data gateway which are installed in system equipment; the controller acquires key data of the system equipment in all aspects through the sensor, and conducts coordinated control over constituent parts of the system according to the acquired data; the controller is in communication with the data gateway, and the controller sends the key data of the system to a cloud-end or far-end server through the data gateway for future reference and management; a demander of relevant data logs into the server by means of digital authentication and reads relevant data and reports; users and equipment manufacturers provide well-planned services in advance according to equipment anomaly and alarm information, and can also upgrade or improve the equipment according to data statistics; and relevant government departments can determine the incineration amount of dead livestock and poultry, household waste and straw for serving as the basis of relevant management according to a complete evidence chain composed of image data, straw delivery speed, the state of the burner, and boiler temperature data reports from before and after dead livestock and poultry or household waste is put in.

In the above technical scheme, the cold air and hot air mixer is a container, an end of the container is a hot air inlet, another end of the container is a cold air and hot air mixture outlet, a cold air siphon inlet is formed in one side of the container, and the cold air siphon inlet communicates with the atmosphere.

In the above technical scheme, the auxiliary material bin contains carbon-containing auxiliary materials, and the carbon-containing auxiliary materials include but are not limited to sawdust, fungus bran, burned residues and/or ash, and the like.

In the above technical scheme, the multifunctional boiler includes a boiler base, a boiler body, a boiler wall, a furnace, a grate, a header, a combustion system, an air feeding device, an air inducing device and a deslagging device; the boiler body is installed on the boiler base, the furnace is a combustion chamber formed by the boiler wall, the boiler body and the grate, and the grate is arranged below the furnace and above the boiler base; the combustion system is composed of a burner, an automatic straw fuel delivery unit and straw fuel blocks, wherein the burner is fixed to a front panel of the boiler through a flange, and a flame nozzle of the burner is located on the front portion of the furnace and above the grate; an incineration door and an incineration bearing platform are designed on the rear portion of the furnace, and a dead animal and household waste delivery unit is installed outside the incineration door; a front smoke box and a rear smoke box are designed at the two ends of the upper portion of the boiler body; the air feeding device and an air inducing device are connected to the two ends of an air circuit of the boiler in series, the air inducing device is composed of a draught fan and a flue, an output of the draught fan is connected with the cold air and hot air mixer, the cold air and hot air mixer is connected with the air blower, and the air blower is connected with the solid high-temperature aerobic fermentation reactor and the liquid high-temperature aerobic fermentation reactor through pipelines; a hot water circulating system is connected between a hot water outlet pipe and a water return pipe of the boiler body, and the hot water circulating system is connected with a circulating pump, a solid high-temperature aerobic fermentation reactor jacket and a liquid high-temperature aerobic fermentation reactor jacket in series; the multifunctional boiler is further provided with a boiler control system, the boiler control system includes a sensor, a programmable controller, an alarm and a data gateway which are installed on the multifunctional boiler, and the boiler control system acquires key data of the multifunctional boiler in all aspects, conducts coordinated control over the constituent parts of the boiler according to the acquired data, and sends key data about boiler operation to a cloud-end or far-end server through the data gateway for future reference or management; the sensor respectively acquires furnace temperature, smoke temperature, the temperature of water inlet and outlet pipes, water level and furnace pressure, and transmits acquired data to the programmable controller; and the programmable controller conducts corresponding control and gives alarm messages according to the data fed back by the sensor, and the alarm messages include a fuel lack alarm message, a water lack alarm message, an overheat alarm message and the like.

In the above technical scheme, the incineration bearing platform is built with a refractory material.

In the above technical scheme, the burner adopts a diesel burner or biogas burner.

A rural bulk organic waste pollutant source comprehensive treatment method based on the above rural bulk organic waste pollutant source comprehensive treatment system includes the steps that:

(1) for excretion waste of a livestock farm adopting a technology of manure cleaning by urine submerging, a solid-liquid separation is firstly performed thereto, wherein solid generated by solid-liquid separation is conveyed to a solid high-temperature aerobic fermentation reactor to be fermented, liquid generated by solid-liquid separation is conveyed to a liquid high-temperature aerobic fermentation reactor to be fermented, and solid organic fertilizers produced by fermentation of the solid high-temperature aerobic fermentation reactor are used for fertilization or soil improvement;

(2) for dry collection manure of a livestock and poultry farm, carbon-containing auxiliary materials are properly added thereto, wherein the carbon-containing auxiliary materials include but are not limited to sawdust, fungus bran, incineration residues and ash, manure and the carbon-containing auxiliary materials are mixed, a manure and carbon-containing auxiliary material mixture is delivered to the solid high-temperature aerobic fermentation reactor to be fermented after the moisture content of the mixture is reduced to 50-80%, and solid organic fertilizers produced by fermentation of the solid high-temperature aerobic fermentation reactor are used for fertilization or soil improvement;

(3) residues left after incineration of dead animals and household waste by a multifunctional boiler, and ash generated by straw burning are delivered to the high-temperature aerobic fermentation reactors to be mixed with livestock and poultry manure and fermented, so that solid organic fertilizers are produced to be used for fertilization or soil improvement;

(4) the liquid generated by the solid-liquid separation performed on the excretion waste of the livestock farm adopting the technology of manure cleaning by urine submerging is delivered into the liquid high-temperature aerobic fermentation reactor for high-temperature fermentation, so that pathogenic bacteria, eggs and plant seeds are killed, and macromolecules in the liquid are decomposed into stable micromolecules which are incapable of causing seedling burn, and thereby serving as a liquid organic fertilizer used for drip irrigation, sprinkling irrigation, fertilization and so forth;

(5) a diesel, biogas or natural gas burner is adopted as the combustion unit or ignition unit of the multifunctional boiler; and in an area with rich straw resources, the automatic straw fuel delivery unit is installed on the boiler, and straw is delivered to a grate of the boiler as fuel;

(6) an incineration door which can be opened is installed on the multifunctional boiler, and dead livestock and poultry animals and household waste can be fed into a furnace of the boiler through the door, so as to be incinerated on an incineration bearing platform;

(7) a smoke exhaust pipe of the multifunctional boiler is connected to one input port of a cold air and hot air mixer, another input port of the mixer is connected to atmosphere, output ports of the cold air and hot air mixer are connected to the input port of an air blower, and the output port of the air blower is connected to an air inlet of the solid high-temperature aerobic fermentation reactor and an air inlet of the liquid high-temperature aerobic fermentation reactor; an exhaust port of the solid high-temperature aerobic fermentation reactor and an exhaust port of the liquid high-temperature aerobic fermentation reactor are connected to a cooling condenser through pipelines, and an exhaust port of the cooling condenser is connected to a biological deodorization filtration tower through a pipeline; and the flow of the air blower is larger than or equal to the sum of the flow of the draught fan in the multifunctional boiler and the flow of air required by the aerobic fermentation reactors;

(8) after smoke discharged by the smoke exhaust pipe of the multifunctional boiler and fresh air are mixed in the cold air and hot air mixer, a mixture is delivered by the air blower to the air inlet of the solid high-temperature aerobic fermentation reactor and the air inlet of the liquid high-temperature aerobic fermentation reactor, so that fermented materials in the aerobic fermentation reactors are supplied with hot mixed gases, and waste gas discharged by the aerobic fermentation reactors is delivered to the biological deodorization filtration tower after being cooled by the cooling condenser, and then is discharged into the atmosphere after being filtered by the biological deodorization filtration tower;

(9) hot water produced by the multifunctional boiler is delivered to a jacket of the solid high-temperature aerobic fermentation reactor and a jacket of the liquid high-temperature aerobic fermentation reactor through a circulating pump so as to be used for heating the reactors and keeping the reactions warm, and a water outlet pipe of each jacket is connected to a water inlet pipe of the boiler to realize circulation;

(10) the automatic control system takes charge in acquiring key data of the comprehensive treatment system in all aspects, and conducts coordinated control over constituent parts of the comprehensive treatment system according to the acquired data:

firstly, the automatic straw fuel delivery unit is started to deliver straw into the boiler, and after the draught fan and an air feeder of the multifunctional boiler are started, the burner ignites;

secondly, after the temperature of the furnace is higher than the ignition temperature of straw, the straw burns, and the automatic control system controls the burner to stop;

thirdly, delivery rhythm and speed of a straw delivery unit are controlled according to differences between temperatures of fermented materials in the solid high-temperature aerobic fermentation reactor and in the liquid high-temperature aerobic fermentation reactor and a set value, so as to adjust the water outlet temperature of automatic circulating water of the multifunctional boiler under 95° C.;

fourthly, when incineration of dead animals or household waste is required, an operator rotates a gate of the incineration door, a switch installed on the incineration door moves, and the control system automatically stops the air feeder of the boiler after detecting the movement of the switch, so as to ensure that flames will not hurt people under the action of the air feeder when the incineration door is opened;

fifthly, the dead animals or the household waste is delivered into the furnace of the boiler through a dead animal and household waste delivery unit, the operator presses an incineration button after the incineration door is closed, so that the air feeder is started, the burner is started if the operator presses a fast incineration button, the operator presses a burner stopping button after incineration to enable the burner to be stopped, a program can also be configured in the automatic control system for timing of the fast incineration, such that the burner is set to be automatically turned off when a timing time being set is reached; and sixthly, a data gateway is in communication with a controller, key data in the controller and the operation state of the system are sent to the cloud-end server or remote server through the data gateway, a demander of relevant data logs into the server by means of digital authentication and reads relevant data and reports, users and equipment manufacturers provide well-planned services in advance according to equipment anomaly and alarm information, and can also upgrade or improve equipment according to data statistics, and relevant government departments can determine the incineration amount of dead livestock and poultry, household waste and straw for serving as the basis of relevant management according to a complete evidence chain composed of image data, straw delivery speed, the state of the burner, and boiler temperature data reports from before and after dead livestock and poultry or household waste is put in; and

(11) the multifunctional boiler is further provided with a boiler control system, the boiler control system includes sensors installed on the multifunctional boiler, a programmable controller, an alarm and a data gateway, and the boiler control system acquires key data of the multifunctional boiler in all aspects, conducts coordinated control over constituent parts of the boiler according to the acquired data, and sends key data about boiler operation to the cloud-end or far-end server through the data gateway for future reference or management; the sensors respectively acquire furnace temperature, smoke temperature, temperatures of water inlet and outlet pipes, water level and furnace pressure, and transmits acquired data to the programmable controller; and the programmable controller conducts corresponding control and gives alarm messages according to the data fed back by the sensors, and the alarm messages include alarm indications such as a fuel lack alarm message, a water lack alarm message, an overheat alarm message and a underpressure alarm message.

Beneficial Effects:

1. the rural bulk organic waste pollutant source comprehensive treatment system can conduct recycling treatment on excrement, livestock and poultry animal bodies, straw, household waste and other bulk organic waste, rural bulk organic waste pollutants are turned into usable resources after being treated by the treatment system, which is in accordance with the circulation law of natural substances, and resources are provided for environment repair while environment burden is reduced;

2. after incineration of livestock and poultry animal bodies, household waste and straw, residues and ash are mixed with excrement for high-temperature fermentation, so that bio-organic fertilizers are produced while animal bodies, household waste and straw are treated in a harmless way, and the contents of phosphorus and potassium nutrients of the bio-organic fertilizers are increased;

3. in the organic waste comprehensive treatment system, when the multifunctional boiler incinerates livestock and poultry animal bodies, household waste and straw, burning heat is used for heating circulating water, the circulating water is used for heating the high-temperature aerobic fermentation reactors and keeping the high-temperature aerobic fermentation reactors warm, and therefore comprehensive utilization of generated energy is realized;

4. when the multifunctional boiler incinerates livestock and poultry animal bodies, household waste and straw, heat and toxic substances including carbon monoxide, sulfur dioxide, nitrogen dioxide, flying ash and odor in waste smoke which is nearly 200 DEG C. are utilized by being mixed with fresh air instead of being directly discharged into the atmosphere, and after the fresh air is heated, the mixture is delivered to the high-temperature aerobic fermentation reactors and the biological deodorization filtration tower to be filtered and then discharged;

5. after filtration of waste smoke by the high-temperature aerobic fermentation reactors, solid substances including flying ash are left in fermented materials in the fermentation reactors, toxic substances including carbon monoxide, sulfur dioxide, nitrogen dioxide and the like in waste smoke are combined with water in fermented excrement in the aerobic fermentation reactors to release H+, so that the PH value of excrement can be reduced, as a result, ammonia-nitrogen release loss of excrement can be reduced, nutrients of organic fertilizers can be maintained, and nutrient loss can be reduced;

6. the organic waste pollutant comprehensive treatment system not only treats pollution comprehensively by converting pollutants into usable resources, but also utilizes energy generated during conversion comprehensively, realizing combination and unification of ecological benefits and economic benefits.

Figure 1:
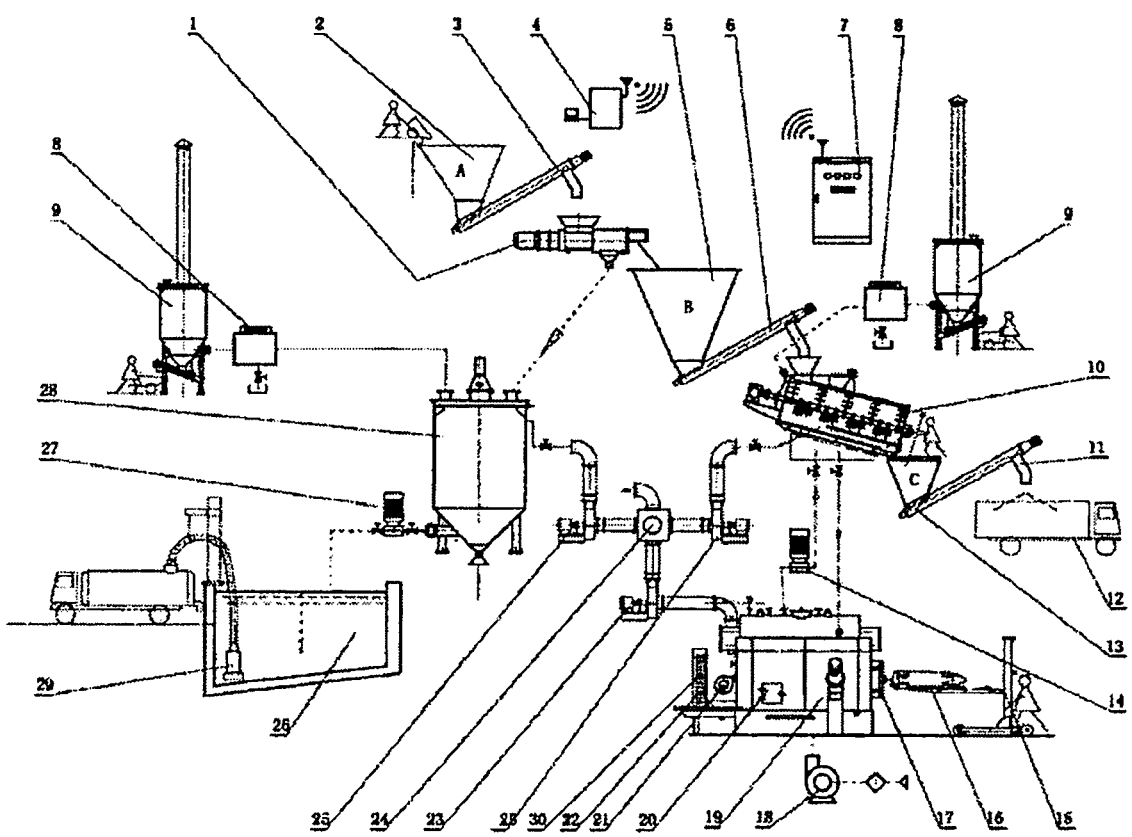
FIG. 1 is a diagram of a waste treatment system for a livestock farm adopting the technology of manure cleaning by urine submerging according to embodiment 1 of the present invention.

1—solid-liquid separation unit, 2—raw manure pit for manure cleaning by urine submerging, 3—delivery unit, 4—cloud-end server or remote server, 5—solid material bin, 6—solid material delivery unit, 7—control system, 8—cooling condenser, 9—biological deodorization filtration tower, 10—solid high-temperature aerobic fermentation reactor, 11—solid organic fertilizer semi-finished product delivery unit, 12—transport vehicle, 13—solid organic fertilizer semi-finished product bin, 14—circulating pump, 15—delivery unit, 16—dead livestock and poultry animal or household waste, 17—incineration door, 18—air feeder, 19—multifunctional boiler, 20—poke door, 21—burner, 22—automatic straw fuel delivery unit, 23—draught fan, 24—cold air and hot air mixer, 25—air blower, 26—liquid fertilizer pit, 27—underflow pump, 28—liquid high-temperature aerobic fermentation reactor, 29—immersible pump, 30—straw block, 31—reactor draught fan, 32—reactor air blower, 201—raw dry collection manure pit, 202—screw conveyer, 203—first auxiliary material bin, 204—secondary auxiliary material bin, 205—feeder, and 206—drum type solid high-temperature aerobic fermentation reactor.

DETAILED DESCRIPTION

A rural bulk organic waste pollutant source comprehensive treatment system according to the present invention includes a solid high-temperature aerobic fermentation reactor, a liquid high-temperature aerobic fermentation reactor and a multifunctional boiler; the multifunctional boiler is a boiler which can adopt various fuels to incinerate dead animals and household waste and produce hot water; a feeding system of the solid high-temperature aerobic fermentation reactor is a waste treatment system for a livestock farm adopting a technology of manure cleaning by urine submerging or a waste treatment system for a livestock farm adopting a technology of dry manure collection, the waste treatment system for the livestock farm adopting the technology of manure cleaning by urine submerging is provided with a solid-liquid separation unit, and the waste treatment system for the livestock farm adopting the technology of dry manure collection is a dry collection manure carbon-containing auxiliary material adding unit; liquid output of the solid-liquid separation unit in the waste treatment system for the livestock farm adopting the technology of manure cleaning by urine submerging is connected to the liquid high-temperature aerobic fermentation reactor, and the liquid high-temperature aerobic fermentation reactor produces liquid organic fertilizers; solid output of the solid-liquid separation unit in the waste treatment system for the livestock farm adopting the technology of manure cleaning by urine submerging is connected to the solid high-temperature aerobic fermentation reactor, and the solid high-temperature aerobic fermentation reactor produces solid organic fertilizers; an incineration door is arranged on the rear portion of the multifunctional boiler, and a dead animal and household waste delivery unit is arranged beside the incineration door; a burner and an automatic straw fuel delivery unit are installed on the front portion of the multifunctional boiler, an air feeder is connected to the bottom of the multifunctional boiler, and a smoke exhaust pipe of the multifunctional boiler is connected with a draught fan; the draught fan is connected to an input port of a cold air and hot air mixer, another input port of the mixer is connected to atmosphere, output ports of the cold air and hot air mixer are connected to an input port of an air blower, and an output port of the air blower is connected with an air inlet of the solid high-temperature aerobic fermentation reactor and an air inlet of the liquid high-temperature aerobic fermentation reactor; an exhaust duct of the solid high-temperature aerobic fermentation reactor and an exhaust duct of the liquid high-temperature aerobic fermentation reactor are connected to a biological deodorization filtration tower after passing through a cooling condenser, and a hot water output pipeline of the multifunctional boiler is connected to a water jacket of the solid high-temperature aerobic fermentation reactor and a water jacket of the liquid high-temperature aerobic fermentation reactor; and the comprehensive treatment system is also provided with an automatic control system.

A raw manure pit for manure cleaning by urine submerging and a delivery unit are arranged in front of the solid-liquid separation unit, and a solid material bin, a solid material delivery unit, a liquid delivery pump and a liquid delivery pipeline are arranged behind the solid-liquid unit.

The dry collection manure carbon-containing auxiliary material adding unit includes a dry collection manure bin and an auxiliary material bin, the auxiliary bin contains carbon-containing auxiliary materials, a discharge outlet of the dry collection manure bin and a discharge outlet of the auxiliary material bin are connected with a screw conveyer, and a discharge end of the screw conveyer is connected with the solid high-temperature aerobic fermentation reactor.

Liquid output of the solid-liquid separation unit is connected to the liquid high-temperature aerobic fermentation reactor through the liquid delivery pump and connecting pipelines.

The smoke exhaust pipe of the multifunctional boiler is connected to the solid high-temperature aerobic fermentation reactor and the liquid high-temperature aerobic fermentation reactor through the draught fan, the cold air and hot air mixer, the air blower and connecting pipelines.

In the above technical scheme, the automatic control system includes sensors installed in system equipment, a controller and a data gateway; the controller acquires key data of the system equipment in all aspects through the sensors, and conducts coordinated control over constituent parts of the comprehensive treatment system according to the acquired data; the controller is in communication with the data gateway, and the controller sends the key data of the system to a cloud-end or remote server through the data gateway for future reference and management; a demander of relevant data logs into the server by means of digital authentication and reads relevant data and reports; users and equipment manufacturers provide well-planned services in advance according to equipment anomaly and alarm information, and can also upgrade or improve the equipment according to data statistics; and relevant government departments can determine the incineration amount of dead livestock and poultry, household waste and straw for serving as the basis of relevant management according to a complete evidence chain composed of image data, the straw delivery speed, the state of the burner, and boiler temperature data reports from before and after dead livestock and poultry or household waste is put in.

The cold air and hot air mixer is a container, an end of the container is a hot air inlet, another end of the container is a cold air and hot air mixture outlet, a cold air siphon inlet is formed in one side of the container, and the cold air siphon inlet communicates with the atmosphere.

In the above technical scheme, the auxiliary material bin contains carbon-containing auxiliary materials, and the carbon-containing auxiliary materials include but are not limited to sawdust, fungus bran, incineration residues and/or ash, and the like.

In the above technical scheme, the multifunctional boiler includes a boiler base, a boiler body, a boiler wall, a furnace, a grate, a header, a combustion system, an air feeding device, an air inducing device and a deslagging device; the boiler body is installed on the boiler base, the furnace is a combustion chamber formed by the boiler wall, the boiler body and the grate, and the grate is arranged below the furnace and above the boiler base; the combustion system is composed of a burner, an automatic straw fuel delivery unit and straw fuel blocks, wherein the burner is fixed to a front panel of the boiler through a flange, and a flame nozzle of the burner is located on the front portion of the furnace and above the grate; the incineration door and an incineration bearing platform are designed on the rear portion of the furnace, and a dead animal and household waste delivery unit is installed outside the incineration door; a front smoke box and a rear smoke box are designed at the two ends of the upper portion of the boiler body; the air feeding device and the air inducing device are connected to the two ends of an air circuit of the boiler in series, the air inducing device is composed of the draught fan and a flue, an output of the draught fan is connected with the cold air and hot air mixer, the cold air and hot air mixer is connected with the air blower, and the air blower is connected with the solid high-temperature aerobic fermentation reactor and the liquid high-temperature aerobic fermentation reactor through pipelines; a hot water circulating system is connected between a hot water outlet pipe and a water return pipe of the boiler body, and the hot water circulating system is connected with a circulating pump, a solid high-temperature aerobic fermentation reactor jacket and a liquid high-temperature aerobic fermentation reactor jacket in series; the multifunctional boiler is further provided with a control system, the control system includes sensors installed on the multifunctional boiler, a programmable controller, an alarm and a data gateway, and the boiler control system acquires key data of the multifunctional boiler in all aspects, conducts coordinated control over the constituent parts of the boiler according to the acquired data, and sends key data about boiler operation to a cloud-end or far-end server through the data gateway for future reference or management; the sensor acquires furnace temperature, smoke temperature, the temperature of water inlet and outlet pipes, water level and furnace pressure, and transmits acquired data to the programmable controller; and the programmable controller conducts corresponding control and gives alarm messages according to the data fed back by the sensor, and the alarm messages include a fuel lack alarm message, a water lack alarm message and an overheat alarm message.

In the above technical scheme, the incineration bearing platform is built with a refractory material.

In the above technical scheme, the burner adopts a diesel burner or biogas burner.

Figure 2:
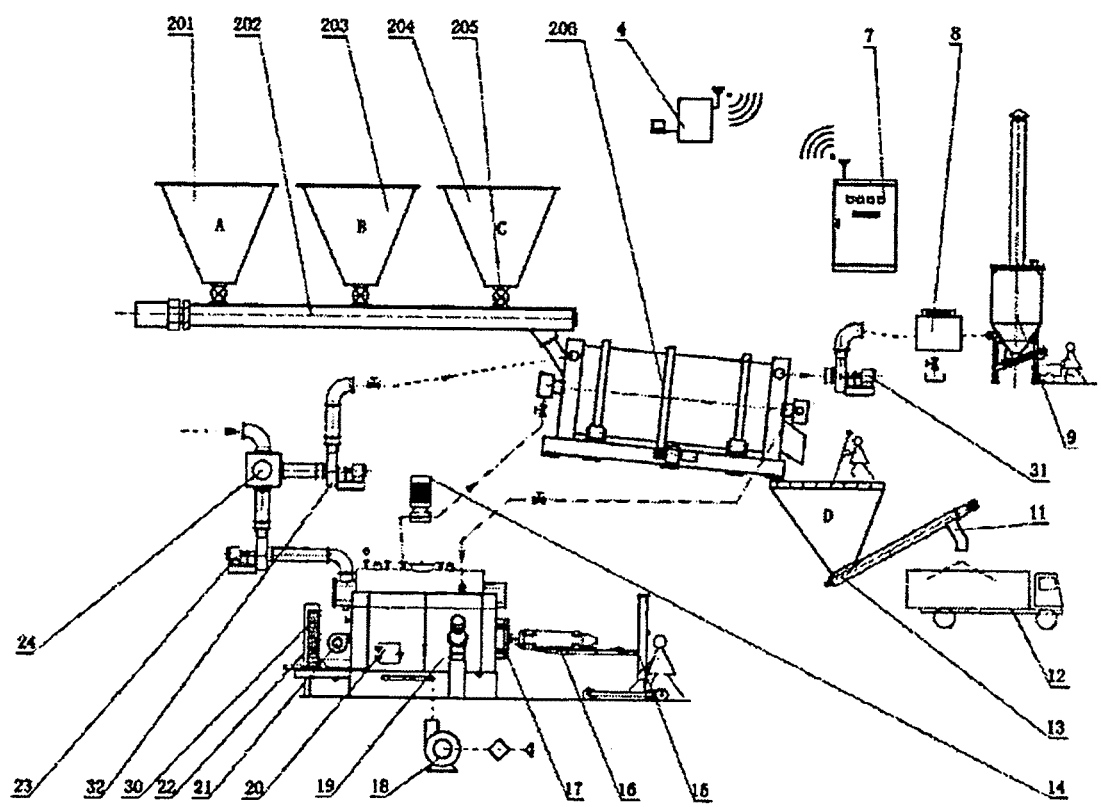
FIG. 2 is a diagram of a waste treatment system for a livestock farm adopting the technology of dry manure collection according to embodiment 2 of the present invention.

Further explanation is made on a rural bulk organic waste pollutant source comprehensive treatment method based on the rural bulk organic waste pollutant source comprehensive treatment system of the present invention with reference to the embodiments as shown in FIG. 1 and FIG. 2:

(1) the rural bulk organic waste pollutant source comprehensive treatment system can be used for comprehensive treatment of bulk organic waste including excrement, livestock and poultry animal bodies, straw, household waste and the like.

(2) the rural bulk organic waste pollutant source comprehensive treatment system includes a control system 7, a solid high-temperature aerobic fermentation reactor 10, a liquid high-temperature aerobic fermentation reactor 28, a multifunctional boiler 19 capable of adopting various fuels to incinerate dead animals and household waste and producing hot water, an air feeder 18 and a draught fan 23 which are matched with the boiler, a solid-liquid separation unit 1, a delivery unit 3, a cold air and hot air mixer 24, a cooling condenser 8, an air blower 25 and a biological deodorization filtration tower 9.

(3) a diesel, biogas or natural gas burner 21 is adopted as a combustion unit or ignition unit of the multifunctional boiler 19; and in an area with rich straw resources, an automatic straw fuel delivery unit 22 is installed on the boiler, and straw blocks 30 are delivered to a grate of the boiler as fuel.

(4) an incineration door 17 which can be opened is installed on the multifunctional boiler 19, and dead livestock and poultry animals and household waste 16 can be fed into a furnace of the boiler through the door by means of the dead animal and household waste delivery unit 15, so as to be incinerated.

(5) a smoke exhaust pipe of the multifunctional boiler 19 is connected with an inlet of the draught fan 23, an air outlet of the draught fan 23 is connected to a hot air input port of the cold air and hot air mixer 24, a fresh air input port of the cold air and hot air mixer 24 is connected to the atmosphere, fresh air enters the cold air and hot air mixer 24 to be mixed with hot boiler flue gas and heated, a plurality of output ports of the cold air and hot air mixer 24 are respectively connected with an input port of the air blower 25, an output port of the air blower 25 is connected with an inlet of the solid high-temperature aerobic fermentation reactor 10 and an inlet of the liquid high-temperature aerobic fermentation reactor 28, an exhaust port of the solid high-temperature aerobic fermentation reactor 10 and an exhaust port of the liquid high-temperature aerobic fermentation reactor 28 are connected to the cooling condenser 8 through pipelines, and an exhaust port of the cooling condenser 8 is connected to the biological deodorization filtration tower 9 through a pipeline.

(6) the output flow of the air blower 25 which blows air to the solid high-temperature aerobic fermentation reactor 10 and the liquid high-temperature aerobic fermentation reactor 28 is larger than or equal to the sum of the flow of the draught fan 23 in the multifunctional boiler and air flow required by the solid high-temperature aerobic fermentation reactor 10 and the liquid high-temperature aerobic fermentation reactor 28.

(7) after smoke discharged by the smoke exhaust pipe of the multifunctional boiler 19 and fresh air are mixed in the cold air and hot air mixer 24, a mixture is delivered by the air blower to the solid high-temperature aerobic fermentation reactor 10 and the liquid high-temperature aerobic fermentation reactor 28, so that fermented materials in the solid high-temperature aerobic fermentation reactor 10 and the liquid high-temperature aerobic fermentation reactor 28 are supplied with hot mixed gases, and waste gas discharged by the solid high-temperature aerobic fermentation reactor 10 and the liquid high-temperature aerobic fermentation reactor 28 is cooled by the cooling condenser 8, and then discharged into the atmosphere after being filtered by the biological deodorization filtration tower 9.

(8) hot water produced by the multifunctional boiler 19 is delivered to a jacket of the solid high-temperature aerobic fermentation reactor 10 and a jacket of the liquid high-temperature aerobic fermentation reactor 28 through a circulating pump 14 so as to be used for heating the reactors and keeping the reactions warm, and a water outlet pipe of each jacket is connected to a water return pipe of the boiler to realize circulation.

(9) the multifunctional boiler is further provided with a boiler control system, the boiler control system includes sensors installed on the multifunctional boiler, a programmable controller, an alarm and a data gateway, and the boiler control system acquires key data of the multifunctional boiler in all aspects, conducts coordinated control over constituent parts of the boiler according to the acquired data, and sends key data about boiler operation to a cloud-end or far-end server through the data gateway for future reference or management; the sensors respectively acquire furnace temperature, smoke temperature, temperatures of water inlet and outlet pipes, water level and furnace pressure, and transmits acquired data to the programmable controller; and the programmable controller conducts corresponding control and gives alarm messages according to the data fed back by the sensors, and the alarm messages include but not limited to a fuel lack alarm message, a water lack alarm message, an overheat alarm message and the like.

(10) the automatic control system 7 takes charge in acquiring key data of the comprehensive treatment system in all aspects, and conducts coordinated control over constituent parts of the comprehensive treatment system according to acquired data:

firstly, the automatic straw fuel delivery unit 22 is started, the draught fan 23 and the air feeder 18 of the multifunctional boiler 19 are started, and the burner 21 ignites, so that the straw blocks 30 are ignited and burnt;

secondly, after the temperature of the furnace is higher than 400 DEG C., the straw blocks which are pushed into the grate by the automatic straw fuel delivery unit 22 can ignite spontaneously, and the control system 7 controls the burner 21 to be stopped;

thirdly, delivery rhythm and speed of the automatic straw fuel delivery unit 22 are controlled according to differences between temperatures of fermented materials in the solid high-temperature aerobic fermentation reactor 10 and the liquid high-temperature aerobic fermentation reactor 28 and a set value; when the temperature of fermented materials is far lower than the set temperature, the delivery speed of the automatic straw fuel delivery unit 22 is increased; when the temperature of fermented materials is close to the set temperature or the water outlet temperature of automatic circulating water of the multifunctional boiler 19 is close to 95 DEG C., the delivery rhythm and speed of the automatic straw fuel delivery unit 22 are reduced, so as to keep the temperature of fermented materials at the set value or nor far from the set value and make the water outlet temperature of the automatic circulating water lower than 95 DEG C.; when the water outlet temperature of the automatic circulating water of the multifunctional boiler 19 reaches 95 DEG C., the control system automatically stops the air feeder till the water outlet temperature of the automatic circulating water is lower than 95 DEG C.;

fourthly, when incineration of the livestock and poultry animals or household waste 16 is required, an operator rotates a gate of the incineration door, a switch installed on the incineration door moves, and the control system 7 automatically stops the air feeder 18 of the multifunctional boiler 19 after detecting the movement of the switch;

fifthly, after the dead animals or household waste 16 is delivered into the multifunctional boiler 19 and the incineration door 17 is closed, the operator presses an incineration button, so that the air feeder 18 is started, the burner 21 is started if the operator presses a fast incineration button, the operator presses a burner stopping button after incineration to enable the burner to be stopped, a program can also be configured in the control system for timing of the fast incineration, such that the burner 21 is set to be automatically turned off when a timing time being set is reached; and sixthly, a data gateway is in communication with a controller, key data in the controller and the operation state of the system are sent to a cloud-end server or remote server 4 through the data gateway, a demander of relevant data logs into the cloud-end server or remote server 4 by means of digital authentication and reads relevant data and reports, users and equipment manufacturers provide well-planned services in advance according to equipment anomaly and alarm information, and can also upgrade or improve equipment according to data statistics, and relevant government departments can determine the incineration amount of dead pigs, household waste and straw for serving as the basis of relevant management according to a complete evidence chain composed of image data, delivery speed of the automatic straw fuel delivery unit 22, the state of the burner 21, and boiler temperature data reports from before and after dead pigs or household waste 16 is put in.

(11) as shown in FIG. 1, for excretion waste of the pig farm adopting the technology of manure cleaning by urine submerging, animal waste in the raw manure pit for manure cleaning by urine submerging 2 is lifted to a feed inlet of the solid-liquid separation unit 1 through the delivery unit 3 for solid-liquid separation first, solid generated by the solid-liquid separation unit 1 is delivered to the solid material bin 5 to be stored and then is quantitatively fed into the solid high-temperature aerobic fermentation reactor 10 by a solid material delivery unit 6 to be fermented according to technological requirements, solid fertilizers obtained after fermentation are delivered to a solid organic fertilizer semi-finished product bin 13 to be stored, the solid organic fertilizer semi-finished product delivery unit 11 takes charge in lifting and truck loading, and then the solid fertilizers are moved away by a transport vehicle 12; liquid generated by the solid-liquid separation unit 1 is delivered to the liquid high-temperature aerobic fermentation reactor 28 to be fermented, and liquid obtained after fermentation is delivered to a liquid fertilizer pit 26 through an underflow pump 27 to be stored, and then loaded in a tank car through a sewage immersible pump 29.

(12) as shown in FIG. 2, carbon-containing auxiliary materials are properly added to dry collection manure of a livestock and poultry farm, the carbon-containing auxiliary materials include but are not limited to sawdust, fungus bran, incineration residues, ash and the like, and a manure and auxiliary material mixture is delivered to a drum type solid high-temperature aerobic fermentation reactor 206 to be fermented after the moisture content of the mixture is reduced to 55-80%; the higher the moisture rate of the manure and auxiliary material mixture is, the longer it takes for water evaporation during fermentation in the drum type solid high-temperature aerobic fermentation reactor 206, and therefore, by reducing the moisture content of the mixture to 55% by means of auxiliary materials as much as possible according to the cost of the auxiliary materials, fast fermentation can be achieved.

(13) dry collection manure of a raw dry collection manure pit 201 and materials in a first auxiliary material bin 203 or a second auxiliary material bin 204 are mixed in a certain proportion under the control of a feeder 205, and then are delivered into the drum type solid high-temperature aerobic fermentation reactor 206 through the screw conveyer 202 to be fermented; organic fertilizer semi-finished products obtained after fermentation are discharged into the solid organic fertilizer semi-finished product bin 13 to be stored through an outlet of the drum type solid high-temperature aerobic fermentation reactor 206, the solid organic fertilizer semi-finished product delivery unit 11 takes charge in lifting and truck loading, and then the organic fertilizer semi-finished products are moved away by the transport vehicle 12 for deep processing or direct use.

(14) residues left after incineration of dead animals and household waste by the boiler, and ash generated after straw burning are delivered to the solid high-temperature aerobic fermentation reactor 10 and the drum type solid high-temperature aerobic fermentation reactor 206 to be mixed with livestock and poultry manure and fermented, so that solid organic fertilizers are produced to be used for fertilization or soil improvement.

(15) liquid generated by the solid-liquid separation performed on the excretion waste of a pig farm adopting the technology of manure cleaning by urine submerging by the solid-liquid separation unit 1 is delivered to the liquid high-temperature aerobic fermentation reactor 28 for high-temperature fermentation, so that pathogenic bacteria, eggs and plant seeds are killed, and macromolecules in the liquid are decomposed into stable micromolecules which cannot cause seedling burn, and then the liquid can be used for drip irrigation, sprinkling irrigation and the like as a liquid organic fertilizer.

What is claimed is:

1. A rural bulk organic waste pollutant source comprehensive treatment system, comprising a solid high-temperature aerobic fermentation reactor, a liquid high-temperature aerobic fermentation reactor and a multifunctional boiler, wherein:
    the multifunctional boiler is a boiler which adopts various fuels to incinerate dead animals and household waste and produces hot water;
    a feeding system of the solid high-temperature aerobic fermentation reactor is a waste treatment system for a livestock farm adopting a technology of manure cleaning by urine submerging, the waste treatment system for the livestock farm adopting the technology of manure cleaning by urine submerging is provided with a solid-liquid separation unit;
    a liquid output of the solid-liquid separation unit in the waste treatment system for the livestock farm adopting the technology of manure cleaning by urine submerging is connected to the liquid high-temperature aerobic fermentation reactor, and the liquid high-temperature aerobic fermentation reactor produces liquid organic fertilizers;
    a solid output of the solid-liquid separation unit in the waste treatment system for the livestock farm adopting the technology of manure cleaning by urine submerging is connected to the solid high-temperature aerobic fermentation reactor, and the solid high-temperature aerobic fermentation reactor produces solid organic fertilizers;
    an incineration door is arranged on the rear portion of the multifunctional boiler, and a dead animal and household waste delivery unit is arranged beside the incineration door;
    a burner and an automatic straw fuel delivery unit are installed on the front portion of the multifunctional boiler, an air feeder is connected to the bottom of the multifunctional boiler, and a smoke exhaust pipe of the multifunctional boiler is connected with a draught;
    a draught fan is connected to an input port of a cold air and hot air mixer, another input port of the mixer is connected to the atmosphere, output ports of the cold air and hot air mixer are connected to an input port of an air blower, and an output port of the air blower is connected to an air inlet of the solid high-temperature aerobic fermentation reactor and an air inlet of the liquid high-temperature aerobic fermentation reactor;
    an exhaust duct of the solid high-temperature aerobic fermentation reactor and an exhaust duct of the liquid high-temperature aerobic fermentation reactor are connected to a biological deodorization filtration tower after passing through a cooling condenser, and a hot water output pipeline of the multifunctional boiler is connected to a water jacket of the solid high-temperature aerobic fermentation reactor and a water jacket of the liquid high-temperature aerobic fermentation reactor; and
    the comprehensive treatment system is also provided with an automatic control system.

2. The rural bulk organic waste pollutant source comprehensive treatment system according to claim 1, wherein a raw manure pit for manure cleaning by urine submerging and a delivery unit are arranged in front of the solid-liquid separation unit, and a solid material bin, a solid material delivery unit, a liquid delivery pump and a liquid delivery pipeline are arranged behind the solid-liquid separation unit.

3. The rural bulk organic waste pollutant source comprehensive treatment system according to claim 1, wherein the liquid output of the solid-liquid separation unit is connected to the liquid high-temperature aerobic fermentation reactor through the liquid delivery pump and connecting pipelines, and the solid output of the solid-liquid separation unit is connected to the solid high-temperature aerobic fermentation reactor through the screw conveyer or a belt conveyer.

4. The rural bulk organic waste pollutant source comprehensive treatment system according to claim 1, wherein the smoke exhaust pipe of the multifunctional boiler is connected to the air inlet of the solid high-temperature aerobic fermentation reactor and the air inlet of the liquid high-temperature aerobic fermentation reactor through the draught fan, the cold air and hot air mixer, the air blower, and connecting pipelines.

5. The rural bulk organic waste pollutant source comprehensive treatment system according to claim 1, wherein:
    the automatic control system comprises sensors, a controller and a data gateway which are installed in system equipment;
    the controller acquires key data of the system equipment in all aspects through the sensors, and conducts coordinated control over constituent parts of the system according to the acquired data;
    the controller is in communication with the data gateway, and the controller sends the key data of the system to a cloud-end or far-end server through the data gateway for future reference and management;
    a demander of relevant data logs into the server by means of digital authentication and reads relevant data and reports;
    users and equipment manufacturers provide planned services in advance according to equipment anomaly and alarm information, and are also capable of upgrading or improving the equipment according to data statistics; and
    relevant government departments are able to determine an incineration amount of dead livestock and poultry, household waste and straw for serving as a basis of relevant management according to a complete evidence chain composed of image data, straw delivery speed, the state of the burner, and boiler temperature data reports from before and after dead livestock and poultry or household waste is put in.

6. The rural bulk organic waste pollutant source comprehensive treatment system according to claim wherein the cold air and hot air mixer is a container, an end of the container is a hot air inlet, another end of the container is a cold air and hot air mixture outlet, a cold air siphon inlet is formed in one side of the container, and the cold air siphon inlet communicates with atmosphere.

7. The rural bulk organic waste pollutant source comprehensive treatment system according to claim 1, wherein:

the multifunctional boiler comprises a boiler base, a boiler body, a boiler wall, a furnace, a grate, a header, a combustion system, an air feeding device, an air inducing device and a deslagging device;

the boiler body is installed on the boiler base, the furnace is a combustion chamber formed by the boiler wall, the boiler body and the grate, and the grate is arranged below the furnace and above the boiler base;

the combustion system is composed of the burner, the automatic straw fuel delivery unit and straw fuel blocks, the burner is fixed to a front panel of the boiler through a flange, and a flame nozzle of the burner is located on the front portion of the furnace and above the grate;

the incineration door and an incineration bearing platform are designed on the rear portion of the furnace, and a dead animal and household waste delivery unit is installed outside the incineration door;

a front smoke box and a rear smoke box are designed at the two ends of the upper portion of the boiler body;

the air feeding device and the air inducing device are connected to the two ends of an air circuit of the boiler in series, the air inducing device is composed of a draught fan and a flue, an output of the draught fan is connected with the cold air and hot air mixer, the cold air and hot air mixer is connected with the air blower, and the air blower is connected with the solid high-temperature aerobic fermentation reactor and the liquid high-temperature aerobic fermentation reactor through pipelines;

a hot water circulating system is connected between a hot water outlet pipe and a water return pipe of the boiler body, and the hot water circulating system is connected with a circulating pump, a solid high-temperature aerobic fermentation reactor jacket and a liquid high-temperature aerobic fermentation reactor jacket in series;

the multifunctional boiler is further provided with a boiler control system, the boiler control system comprises sensors installed on the multifunctional boiler, a programmable controller, an alarm and a data gateway, and the boiler control system acquires key data of the multifunctional boiler in all aspects, conducts coordinated control over constituent parts of the boiler according to the acquired data, and sends key data about boiler operation to a cloud-end or far-end server through the data gateway for future reference or management;

the sensors acquire a furnace temperature, a smoke temperature, temperatures of water inlet and outlet pipes, a water level and a furnace pressure, respectively, and transmits acquired data to the programmable controller; and the programmable controller conducts corresponding control and gives alarm messages according to the data fed back by the sensors, and the alarm messages include a fuel lack alarm message, a water lack alarm message, or an overheat alarm message.

8. The rural bulk organic waste pollutant source comprehensive treatment system according to claim 1, wherein the incineration bearing platform is built with a refractory material, and the burner is a burner adopting a fuel including diesel, biogas, or natural gas.

9. A rural bulk organic waste pollutant source comprehensive treatment method based on the rural bulk organic waste pollutant source comprehensive treatment system of claim 1, comprising:

(1) for excretion waste of a livestock farm adopting a technology of manure cleaning by urine submerging, firstly performing a solid-liquid separation thereto, wherein solid generated by solid-liquid separation is conveyed to a solid high-temperature aerobic fermentation reactor to be fermented, liquid generated by solid-liquid separation is conveyed to a liquid high-temperature aerobic fermentation reactor to be fermented, solid organic fertilizers produced by fermentation of the solid high-temperature aerobic fermentation reactor are used for fertilization or soil improvement, and liquid organic fertilizers produced by fermentation of the liquid high-temperature aerobic fermentation reactor can be used for drip irrigation and sprinkling irrigation after being diluted by water;

(3) delivering residues left after incineration of dead animals and household waste by a multifunctional boiler, and ash generated by straw burning to the high-temperature aerobic fermentation reactors to be mixed with the manure and to be fermented, so that the solid organic fertilizers are produced to be used for fertilization or soil improvement;

(4) delivering the liquid generated by the solid-liquid separation performed on the excretion waste of the livestock farm adopting the technology of manure cleaning by urine submerging to the liquid high-temperature aerobic fermentation reactor for high-temperature fermentation, so that pathogenic bacteria, eggs and plant seeds are killed and macromolecules in the liquid are decomposed into stable micromolecules which are incapable of causing seedling burn;

(5) adopting a diesel, biogas or natural gas burner as a combustion unit or ignition unit of the multifunctional boiler, wherein, in an area with straw resources, an automatic straw fuel delivery unit is installed on the boiler, and straw is delivered to a grate of the boiler as fuel;

(6) installing an incineration door which is capable to be opened on the multifunctional boiler, and feeding dead livestock and poultry animals and household waste into a furnace of the boiler through the door, so as to be incinerated on an incineration bearing platform.

10. The rural bulk organic waste pollutant source comprehensive treatment method according to claim 9, wherein: the method further comprises:

(7) a smoke exhaust pipe of the multifunctional boiler being connected to one input port of a cold air and hot air mixer, another input port of the mixer being connected to atmosphere, output ports of the cold air and hot air mixer being connected to an input port of an air blower, and an output port of the air blower being connected to an air inlet of the solid high-temperature aerobic fermentation reactor and an air inlet of the liquid high-temperature aerobic fermentation reactor; an exhaust port of the solid high-temperature aerobic fermentation reactor and an exhaust port of the liquid high-temperature aerobic fermentation reactor being connected to a cooling condenser through pipelines, and an exhaust port of the cooling condenser being connected to a biological deodorization filtration tower through a pipeline; and the flow of the air blower being larger than or equal to the sum of the flow of the draught fan in the multifunctional boiler and the flow of air required by the aerobic fermentation reactors;

(8) after smoke discharged by the smoke exhaust pipe of the multifunctional boiler and fresh air are mixed in the cold air and hot air mixer, delivering a mixture by the air blower to the air inlet of the solid high-temperature aerobic fermentation reactor and the air inlet of the liquid high-temperature aerobic fermentation reactor, so as to supply hot mixed gases to fermented materials in the aerobic fermentation reactors, wherein waste gas discharged by the aerobic fermentation reactors is delivered to the biological deodorization filtration tower after being cooled by the cooling condenser, and then is discharged into the atmosphere after being filtered by the biological deodorization filtration tower;

(9) delivering hot water produced by the multifunctional boiler to a jacket of the solid high-temperature aerobic fermentation reactor and a jacket of the liquid high-temperature aerobic fermentation reactor through a circulating pump, wherein a water outlet pipe of each jacket is connected to a water inlet pipe of the boiler to realize circulation;

(10) adopting an automatic control system to take charge in acquiring key data of the comprehensive treatment system in all aspects and to conduct coordinated control over constituent parts of the comprehensive treatment system according to acquired data by:

firstly, starting the automatic straw fuel delivery unit to deliver the straw into the boiler, and after igniting the burner after starting the draught fan and an air feeder of the multifunctional boiler;

secondly, burning the straw after the temperature of the furnace is higher than the ignition temperature of straw, and controlling by the automatic control system to stop the burner;

thirdly, controlling a delivery rhythm and a speed of a straw delivery unit according to differences between temperatures of fermented materials in the solid high-temperature aerobic fermentation reactor and in the liquid high-temperature aerobic fermentation reactor and a set value, so as to adjust a water outlet temperature of automatic circulating water of the multifunctional boiler under 95° C.;

fourthly, when requiring an incineration of dead animals or household waste, rotating a gate of the incineration door by an operator, moving a switch installed on the incineration door, and automatically stopping the air feeder of the boiler by the control system after detecting the movement of the switch so as to ensure that flames are unable to hurt people under an action of the air feeder when the incineration door is opened;

fifthly, delivering the dead animals or the household waste into the furnace of the boiler through a dead animal and household waste delivery unit, pressing an incineration button by the operator after the incineration door is closed, and starting the air feeder wherein the burner is started if the operator presses a fast incineration button; after the incineration, pressing a burner stopping button by the operator to stop the burner wherein the automatic control system is able to be configured with a program for timing of a fast incineration, such that the burner is set to be automatically turned off when a timing time being set is reached; and sixthly, enabling a data gateway to be in communication with a controller, sending a key data in the controller and an operation state of the comprehensive treatment system to a cloud-end server or a remote server through the data gateway, wherein a demander of relevant data logs into the server by means of digital authentication and reads relevant data and reports, users and equipment manufacturers provide well-planned services in advance according to equipment anomaly and alarm information, and are capable of upgrading and improving equipment according to data statistics, and relevant government departments are able to determine an incineration amount of dead livestock and poultry, household waste and straw for serving as a basis of relevant management according to a complete evidence chain composed of image data, straw delivery speed, the state of the burner, and boiler temperature data reports from before and after dead livestock and poultry or household waste is put in; and

(11) further providing the multifunctional boiler with a boiler control system, wherein the boiler control system comprises sensors installed on the multifunctional boiler, a programmable controller, an alarm and a data gateway, and the boiler control system acquires key data of the multifunctional boiler in all aspects, conducts coordinated control over constituent parts of the boiler according to the acquired data, and sends key data about boiler operation to a cloud-end or far-end server through the data gateway of the boiler control system for future reference or management; respectively acquiring a furnace temperature, a smoke temperature, temperatures of water inlet and outlet pipes, a water level and a furnace pressure, and transmitting acquired data to the programmable controller, by the sensors; and conducting a corresponding control and providing alarming messages, by the programmable controller conduct, according to the data fed back by the sensors, wherein the alarm messages include alarm indications of a fuel lack alarm message, a water lack alarm message, an overheat alarm message and a underpressure alarm message.

* * * * *